Oct. 22, 1963  A. F. FAIRBANKS  3,108,270
INTERLOCKED RADAR AND INFRARED DETECTOR SYSTEM
Filed Dec. 23, 1954  4 Sheets-Sheet 1

INVENTOR.
AVARD F. FAIRBANKS
BY
ATTORNEY

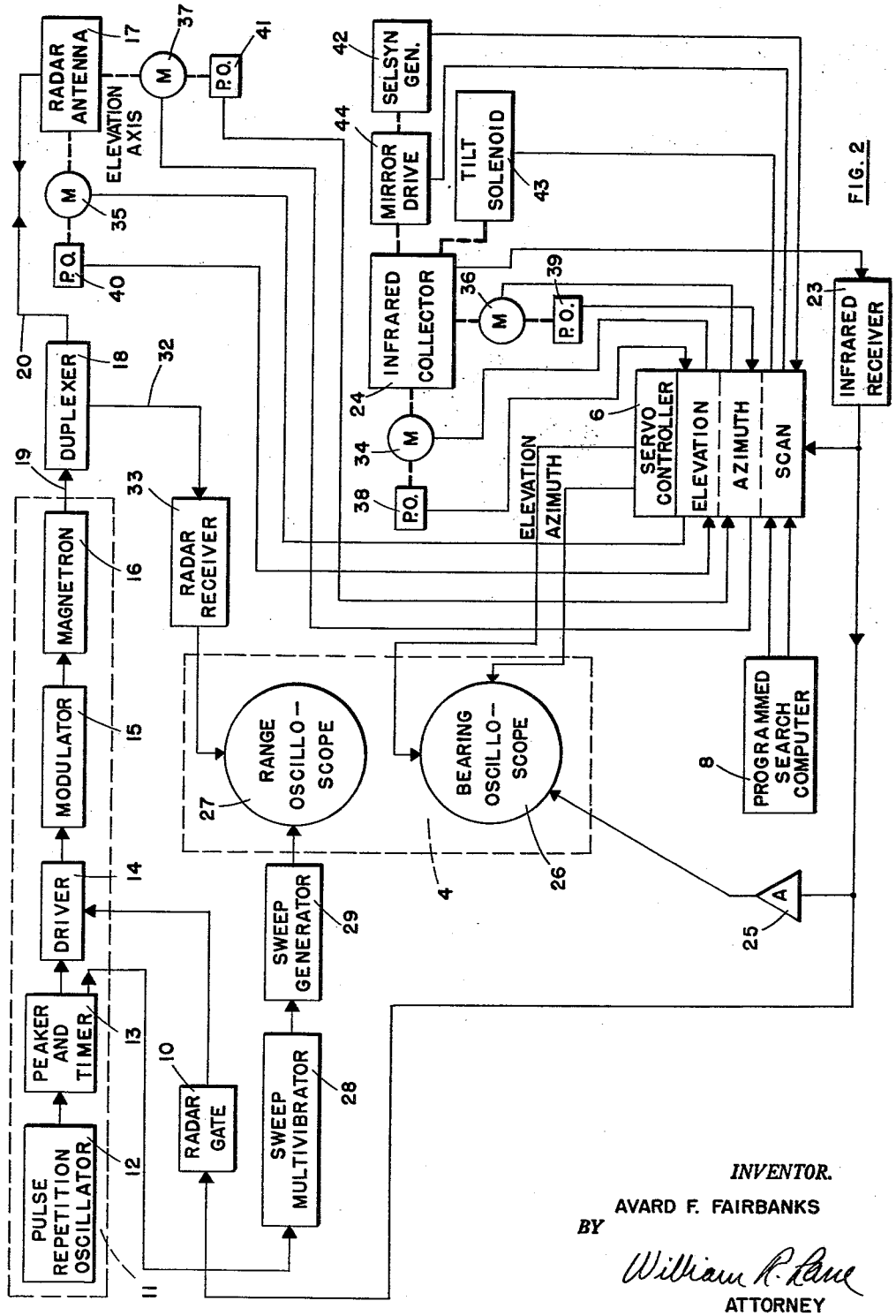

INVENTOR.
AVARD F. FAIRBANKS

ATTORNEY

Oct. 22, 1963                A. F. FAIRBANKS                3,108,270
                INTERLOCKED RADAR AND INFRARED DETECTOR SYSTEM
Filed Dec. 23, 1954                                    4 Sheets-Sheet 4

INVENTOR.
AVARD F. FAIRBANKS
BY
*William R. Lane*
ATTORNEY

3,108,270
INTERLOCKED RADAR AND INFRARED DETECTOR SYSTEM

Avard F. Fairbanks, South San Gabriel, Calif., assignor to North American Aviation, Inc.
Filed Dec. 23, 1954, Ser. No. 477,306
5 Claims. (Cl. 343—6)

This invention relates to apparatus for the detection of radiating targets and particularly to an interlocked radar and infrared detector system.

It is frequently necessary, particularly in the military art, to obtain an accurate indication of the range and bearing of a target from the position of the detector. Most targets which are of interest to military personnel are radiating targets such as tanks, aircraft, trains, ships, etc. All of these targets are continuous emitters of heat or infrared rays. They are also solid objects which are good reflectors of high frequency radio waves. In the past, range and bearing information has usually been provided by a conventional radar. Utilizing radar it is possible to obtain very accurate indications of range. However, simple radars, when used to measure bearings, have poor resolution. In addition, radars are susceptible to jamming and to indicating false targets by the use of small artificial reflectors. A further disadvantage, in the use of radar by planes or ships operating in enemy territory, is the necessity of continuously transmitting high frequency pulses in order to obtain the echo indication from a target. These transmitted pulses not only disclose to the enemy the presence of the transmitting ship or plane but also, by utilizing two or more direction finding receivers, enable the enemy to obtain an accurate indication of the bearing and position of the transmitting plane or ship. For this latter reason, ships and planes have frequently had to maintain radar silence during a military operation to prevent disclosure of their position to the enemy.

Infrared detectors have been developed in the past which produce an accurate indication of the angular position or bearing of a source of radiant energy. These detectors usually consist of a highly directional optical collector and an infrared receiver. The collector is adapted to gather radiant energy from a source thereof positioned along its axis of sensitivity and to cast this energy onto a photosensitive element. The infrared receiver produces an electrical signal in response to the actuation of the photosensitive element. The bearing of the target is obtained by measuring the position angles of the axis of sensitivity of the collector at the time the photosensitive cell is actuated by the radiant energy. It is to be noted that an infrared detector is a dormant or passive device, that is, it does not emit any signals which may be detected by the enemy. A disadvantage of infrared detectors is that they do not ordinarily indicate or measure the range to the target. Infrared detectors are also susceptible to jamming or to indicating false targets when a flare or other decoy heat radiator is used by the enemy.

It is therefore an object of this invention to provide an improved target detector utilizing an interlocked radar and infrared detector system.

It is another object of this invention to provide in combination with a radar, an infrared triggering device which operates to prevent transmission of radio frequency energy by the radar until a source of radiant energy is detected.

It is a further object of this invention to provide in a target detector an interlock between a radar and an infrared detector which prevents operation of the radar until actuation of the infrared detector.

It is another object of this invention to provide an interlocked radar and infrared detector system in which the infrared detector continuously searches for radiating targets while the radar is silent, in which the radar is aimed in synchronism with the infrared detector, in which the detection of a target by the infrared detector triggers the radar into transmitting radio frequency energy, and in which range indication is obtained from the radar and bearing indication is obtained from the infrared detector.

Other objects of invention will become apparent from the following description taken in connection with the accompanying drawings, in which:

FIG. 2 is a detailed block diagram of the system of FIG. 1;

Figure 5:
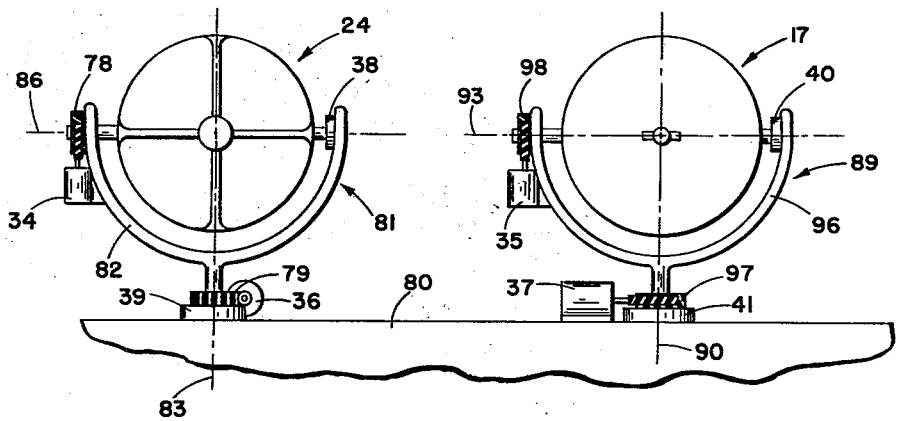
FIG. 5 is a view of the radar antenna and infrared collector utilized with the detector system of FIG. 2.
Figure 6:
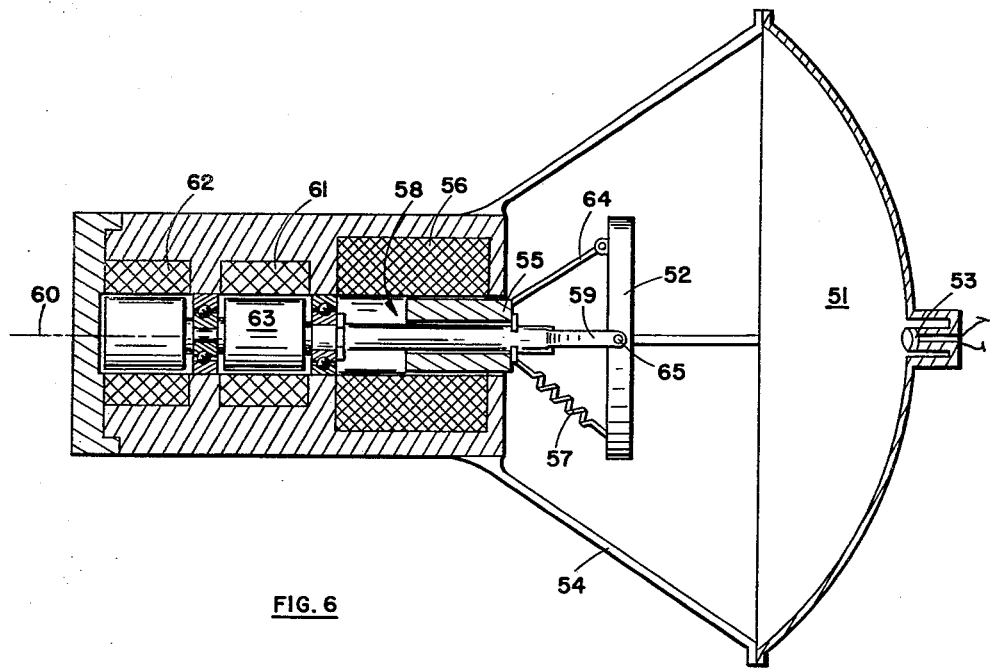

And FIG. 6 is a sectioned view of a preferred embodiment of the infrared collector utilized in FIG. 5.

Figure 1:
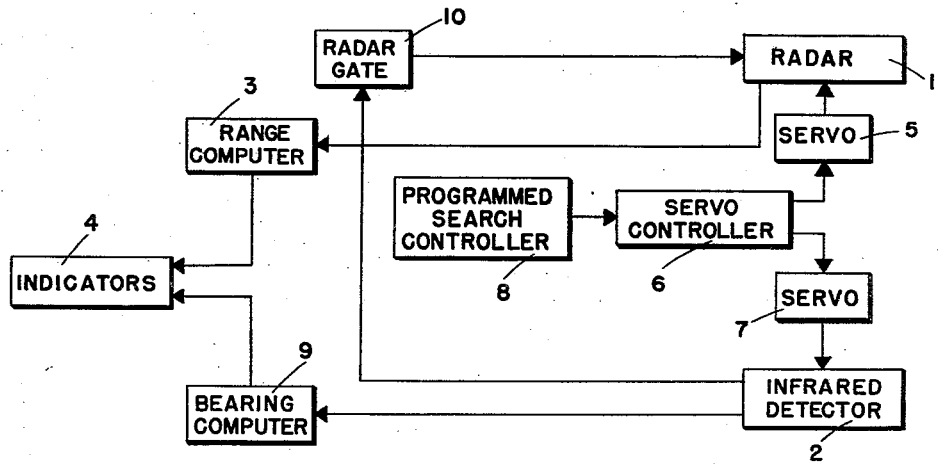
FIG. 1 is a simplified block diagram of a preferred embodiment of the interlocked radar and infrared detector system contemplated by this invention.

Referring now to FIG. 1, a simplified block diagram of a preferred embodiment of the detector system contemplated by this invention is shown. Radar 1 is a conventional radar preferably utilizing the pulse modulation method. Provision is made, by a circuit to be described later, to block transmission of the radar pulses unless a radiating target is detected by infrared detector 2. When operating, radar 1 provides information useful for range computation in a conventional manner. However, as previously pointed out the bearing information from simple radars is poor in resolution. Infrared detector 2 is constructed with a highly directional optical collector which results in its being sensitive only to those radiating targets which are within a very small solid angle about its axis of sensitivity. Highly accurate bearing information is therefore obtainable from infrared detector 2.

The pulse modulation radar transmits radio-frequency energy in pulses. The time duration of these pulses is very short, usually from 1 to 50 microseconds. Transmission is turned off before the reflected energy returns from the target. The radar receiver distinguishes between the transmitted pulse and the received pulse. The radar receiver output is coupled into range computer 3 which measures the time interval between the transmission pulse and the received pulse and converts this time measurement into an appropriate range measurement. This range measurement is visually presented on an oscilloscope in indicator 4.

The radar antenna is aimed in azimuth and elevation by servo 5. The infrared collector is aimed in azimuth and elevation by servo 7. Synchronization in aiming is attained by energizing both servos from servo controller 6. Programmed search controller 8 supplies search information to servo controller 6. As a result, the radar antenna and the infrared collector are trained in synchronism in a predetermined manner over the area to be searched. Servo controller 6 also provides the signals for rapidly scanning a solid search angle with the sensitive axis of infrared detector 2.

As previously pointed out, infrared detector 2 is only sensitive to those radiating targets which are within a very small solid angle about its axis of sensitivity. By measuring the angular position of the axis of sensitivity of detector 2 when the detector is actuated by radiant energy rays, an accurate measurement of the bearing of the target is obtained. Bearing computer 9 converts this angular measurement into azimuth and elevation components which in turn are visually presented on an oscilloscope in indicator 4. Detection of radiant energy by detector 2 also generates an electric pulse which actuates radar gate 10 to unblock radar 1.

Referring now ot FIG. 2 a detailed block diagram of a preferred embodiment of the interlocked radar and infrared detector system contemplated by this invention is shown. In this diagram radar transmitter 11, consisting of pulse repetition oscillator 12, peaker and timer 13, driver 14, modulator 15 and magnetron 16, ordinarily transmits pulses of radio-frequency energy to radar antenna 17 through duplexer 18 and wave guides 19 and 20. However, as will be shown later, driver 14 is normally maintained below cut-off until a gating pulse is generated by radar gate 10 and coupled into driver 14. Radar gate 10 generates this gating pulse only when it is triggered by infrared receiver 23 upon the detection of a radiating target.

Infrared collector 24 is preferably a highly directional reflecting telescope having a primary mirror and a secondary mirror. A photosensitive cell is positioned at a focal point of the telescope. This cell is preferably a very small photoconductive type cell utilizing lead sulfide, lead selenide or lead telluride, cooled or uncooled. Whenever a cell of this type is irradiated by heat waves of wavelengths between one micron and 4.5 microns, it experiences a decrease in resistance. Infrared receiver 23 is responsive to this change in resistance and produces a signal output each time the photosensitive cell is actuated. This signal output actuates the aforementioned radar gate 10 to thereby unblock radar transmitter 11. The output from receiver 23 is also fed through amplifier 25 to the intensity coil of bearing oscilloscope 26 of indicator 4. A third use of the output pulse of infrared receiver 23 is to actutae a circuit in servo controller 6 whenever the operator desired to track a given target. This latter circuit will be explained in greater detail later.

Referring once again to the radar portion of FIG. 2, after radar gate 10 unblocks transmitter 11, a radio frequency pulse is transmitted by antenna 17 toward the target. Simultaneously the horizontal sweep of range oscilloscope 27 in indicator 4 is actuated by a pulse from peaker and timer 13 via sweep multivibrator 28 and sweep generator 29. For a type A presentation on oscilloscope 27, this sweep is caused by a sawtooth voltage impressed on the horizontal plates of the range oscilloscope. An echo from the target is picked up by radar antenna 17 and guided through wave guide 20, duplexer 18 and wave guide 32 to radar receiver 33. Radar receiver 33 amplifies and shapes this echo and is coupled to the vertical deflection plates of range oscilloscope 27. The relative position horizontally of the pip caused by this echo is therefore a measure of the range to the target. It is to be noted that if the target which actuated infrared receiver 23 was a dummy hot target or flare, the radar receiver receives an echo much smaller in magnitude than it would have received from a large metallic object such as an aircraft. This small signal, which may even be lost in the noise, indicates that the infrared target is a decoy.

Servo controller 6 controls the aiming of antenna 17 and collector 24 by actuating in synchronism elevation motors 34 and 35, as well as azimuth motors 36 and 37. Motors 34 and 36 aim infrared collector 24 in elevation and azimuth respectively with respect to some predetermined reference plane and reference line in the plane. Motors 35 and 37 aim radar antenna 17 in elevation and azimuth respectively with respect to the same or parallel reference plane and line. Pickoffs 38 and 39 of infrared collector 24 indicate angular bearings in elevation and azimuth respectively of the collector. Pickoffs 40 and 41 on radar antenna 17 indicate angular bearings in elevation and azimuth respectively of the antenna. The actuation of motors 34–37 by servo controller 6 is normally in response to some predetermined search pattern computed in programmed search controller 8. This may be either a manual change of the search area by the operator or an entirely automatic planned operation utilizing prerecorded signals. Servo controller 6 also controls the rapid scan of a search angle by the axis of sensitivity of infrared collector 24 utilizing tilt solenoid 43 and secondary mirror drive 44. Servo controller 6 utilized the information supplied from the pickoffs of antenna 17 and collector 24 as well as the information supplied by selsyn generator 42, by a circuit to be described later, to generate voltages which are predetermined functions of the elevation angle and azimuth angle of a radiating target. These voltages are coupled to the horizontal and vertical deflection plates respectively of oscilloscope 26 which presents bearing information with a type C presentation.

Referring now to FIG. 6 a sectioned view of a preferred embodiment of the infrared collector utilized in the apparatus of FIG. 2 is shown. This collector is essentially a reflecting telescope having parabolic primary mirror 51, flat secondary mirror 52 and photosensitive cell 53 at its focal point. The relative spacings of mirrors 51 and 52 and cell 53 are maintained constant by spider framework 54. The distance from mirror 52 to cell 53 is equivalent to half the focal length of mirror 51. Solenoid plunger 55, moving in response to the magnetic pull of solenoid coil 56, operates through link 64 to tilt mirror 52 about an axis through pin 65. The rotation of mirror 52 is opposed by spring 57. Spring 57 and solenoid 58 are designed in a well known manner to accomplish an angular movement of mirror 52 which is substantially a linear function of the current flowing in solenoid coil 56. Mirror 52, solenoid plunger 55, spring 57 and mirror support 59 are also mounted to rotate about axis 60. Constant speed motor 61 accomplishes this rotation of mirror 52 about axis 60. Axis 60 coincides with the axis of parabolic mirror 51 and is also identified as the search axis of the infrared detector.

As long as flat secondary mirror 52 remains in the untilted position, as shown in FIG. 6, the sensitive axis of the telescope coincides with search axis 60. The sensitive axis of the telescope is the line along which a source of radiant energy must be positioned in order that the telescope cast that radiant energy onto photosensitive cell 53. It is to be noted that, as long as mirror 52 is untilted, the rotation of mirror 52 about axis 60 does not affect the optics of the system. If now, mirror 52 is tilted a slight amount (counterclockwise in FIG. 6) the target would have to be below axis 60 before its rays would be reflected by the telescope onto cell 53. The tilting of mirror 52 is equivalent to a corresponding vertical movement of cell 53 placing it in position to be sensitive to radiant energy rays from a source along an axis at some angle with axis 60. Therefore, the sensitive axis of the telescope is deflected away from axis 60 by the tilting of mirror 52. The magnitude of the deflection is proportional to the magnitude of the tilt angle. As tilted mirror 52 is rotated by motor 61, the sensitive axis also rotates through space in effect sweeping around the surface of a circular cone. If the tilt angle is varied linearly while simultaneously rotating mirror 52 about axis 60, the sensitive axis generates a spiral conical scan.

Selsyn generator 62 is provided to continuously indicate the angular position of rotor 63 and mirror 52 with respect to some fixed zero position. This angular position is utilized, by a circuit to be described later, to accurately measure the angular positions in elevation and azimuth of the sensitive axis of the telescope when a radiating target is detected by the telescope. As will be seen later, this angular position is also utilized when the detecting apparatus is switched from a searching function to a tracking function.

Figure 3:
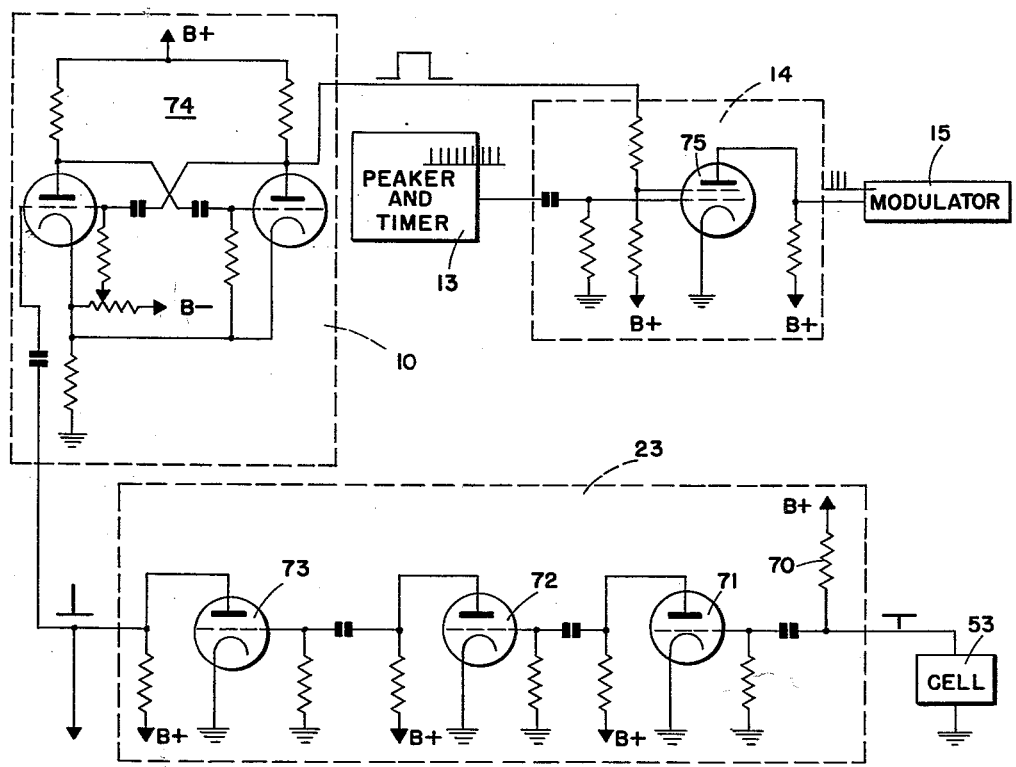
FIG. 3 is a schematic drawing of a circuit utilized for electrically interlocking the detector system of FIG. 2.

Referring now to FIG. 3, a schematic drawing of a circuit utilized to accomplish the electrical interlocking of the radar transmitter with the infrared receiver is shown. As the sensitive axis of the infrared collector of FIG. 2 is for a brief instant aligned with the line of sight to a radiating target, the photosensitive element of the collector is subjected to the radiant energy from the target. This photosensitive element is shown in FIG. 3 as cell 53. Cell 53 is subjected to a constant D.-C. potential from a source (not shown) through resistor 70. When cell 53 is subjected to infrared rays, it undergoes a rapid drop in resistivity. This change in resistivity appears as a negative pulse on the grid of first amplifier 71 of infrared receiver 23. The pulse is amplified by amplifiers 71—73. The output of amplifier 73 is a large positive pulse. This positive pulse trips monostable multivibrator 74 of radar gate 10. Radar gate 10 produces a positive square wave voltage output, the width of which depends on the circuit components of multivibrator 74. This square wave output unblocks tetrode 75 of driver 14 thereby allowing the pulsed output from peaker and timer 13 to be coupled through to modulator 15. The radar transmitter now transmits pulses of radio frequency energy as long as tetrode 75 remains unblocked. At the end of the gating pulse from radar gate 10, the transmitter is cut off until the infrared detector detects a target again.

Referring to FIG. 5 a plan view of the mounting of infrared collector 24 and radar antenna 17 on a supporting structure is shown. The telescope of infrared collector 24 is supported on framework 80 by means of gimbal system 81. Framework 80 is any convenient structure, such as a stabilized platform, which is used as a reference for the measurement of the azimuth and elevation of the target. Gimbal ring 82 is rotatable about vertical axis 83 by azimuth motor 36 through worm and wheel gear train 79. Pickoff 39, which may be a linearly wound ring potentiometer, is positioned to produce an output which is a predetermined function of the azimuth angle of outer gimbal ring 82 with respect to a predetermined reference line in the plane of framework 80. The telescope of infrared collector 24 is rotatable about horizontal axis 86 by elevation motor 34 acting through worm and wheel gear train 78. Pickoff 38, which is also preferably a linearly wound ring potentiometer, provides an output which is a function of the elevation angle of antenna 24 with respect to the plane of frame work 80.

Similarly radar antenna 17 is supported on framework 80 by means of gimbal system 89. Gimbal ring 96 is rotatable about vertical axis 90 by azimuth motor 37 through worm and wheel gear train 97. Pickoff 41 is positioned to produce an output which is a predetermined function of the angular position in azimuth of radar antenna 17. Radar antenna 17 is also rotatable about horizontal axis 93 by means of elevation motor 35 through worm and wheel gear train 98. Pickoff 40 produces an output which is a predetermined function of the position angle in elevation of antenna 17. Motors 34–37 are preferably reversible D.-C. motors which acts through reduction gear trains 78, 98, 79, and 97 respectively, to produce a shaft rotation, in response to a D.-C. signal input. The direction of rotation of the output is determined by the polarity of the input signal and the magnitude of rotation is substantially equivalent to the integral of the input. By utilizing a comparison circuit (to be described later) the use of highly precise motors is made unnecessary. Pickoffs 38—41 may be any convenient angle measuring means. For simplicity an ordinary linearly wound, ring potentiometer is utilized in the example with its wiper rigidly attached to a pinion and its ring resistor secured to the appropriate gimbal ring or framework.

Figure 4:
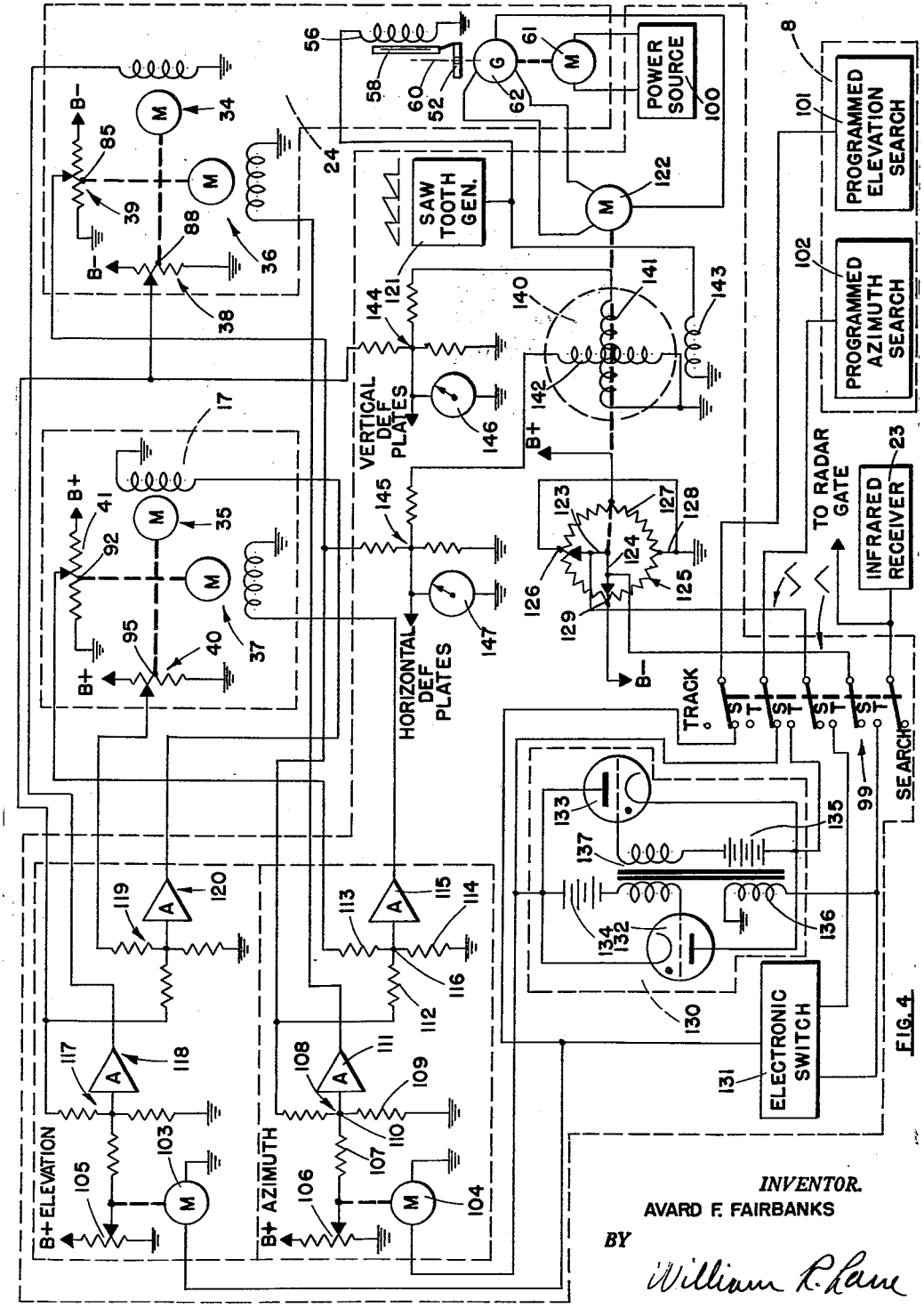
FIG. 4 is a schematic drawing of a circuit utilized for synchronizing the aiming of the radar antenna and infrared collector of the detector system of FIG. 2.

Referring now to FIG. 4 a schematic drawing of a circuit, which may be utilized to insure the synchronized aiming of the radar antenna and the infrared collector, is shown. During the search function of the detector apparatus, the aiming of the radar antenna and infrared collector is controlled by programmed search controller 8. During the tracking function of the apparatus, the aiming of the antenna and collector is controlled by the detection of a radiating target by infrared receiver 23. Switch 99, which may be manually operated by the operator, determines which function is to be performed by the apparatus.

Infrared collector 24 is positioned in azimuth by azimuth motor 36 and in elevation by elevation motor 34. The instantaneous position of infrared collector 24 is indicated in azimuth by azimuth pickoff 39 and in elevation by elevation pickoff 38. Radar antenna 17 is positioned in azimuth by azimuth motor 37 and in elevation by elevation motor 35. The instantaneous position of radar antenna 17 is indicated in azimuth by azimuth pickoff 41 and in elevation by elevation pickoff 40. The sensitive axis of infrared collector 24 is made to periodically scan a solid search angle about a predetermined search axis by utilizing solenoid 58 and motor 61, previously described with respect to FIG. 6, to vary the tilt angle and to rotate respectively the secondary mirror of the telescope. The current flowing in solenoid coil 56 determines the magnitude of the tilt angle while motor 61 continuously rotates at a constant speed the secondary mirror. Selsyn generator 62, the rotor of which is shaft driven by motor 61, continuously indicates the instantaneous angular position of the mirror.

The synchronized searching of an area by radar antenna 17 and infrared collector 24 is accomplished by utilizing a plurality of comparator circuits and closed loop servo systems. The basic area search pattern is determined by the output signals from programmed elevation search computer 101 and azimuth search computer 102. With switch 99 in the search position, as shown, the output signals from computers 101 and 102 drive motors 103 and 104 respectively, in some predetermined programmed manner. The exact nature of the output signals from computers 101 and 102 will necessarily depend on the pattern to be followed when searching a given area for radiating targets. For example, all portions of a rectangular area can easily be searched by a horizontal sweep of the antennas coupled with a step vertical movement of the antennas at each end of the horizontal sweep. Thus azimuth computer 102 can generate a constant D.-C. potential which periodically changes polarity. This accomplishes the back and forth horizontal sweep. Each time the potential reverses in polarity, elevation computer 101 generates a pulse thereby effectively changing the elevation angle of the antennas a slight amount.

Motors 103 and 104 position the wipers on elevation set potentiometer 105 and azimuth set potentiometer 106, respectively. The settings on potentiometers 105 and 106 determine the instantaneous angular positions, in elevation and in azimuth respectively, of radar antenna 17 and infrared collector 24.

Consider first the circuit utilized in connection with azimuth positioning. The angle infrared collector 24 makes in azimuth with respect to a predetermined reference line, determines the position of the wiper on potentiometer 85 of azimuth pickoff 39. If this azimuth angle is exactly equal to the desired azimuth angle, the potential picked off by the wiper on potentiometer 85 is exactly equal and opposite in sign to the potential picked off by the wiper on potentiometer 106. It is to be noted that potentiometer 85 is connected across a negative source (not shown) of potential indicated as B— while potentiometer 106 is connected across a positive soure (not shown) of potential indicated as B+.

The two potentials picked off by the wipers are compared by utilizing a comparator circuit consisting of resistors 107, 108 and 109. As long as the potentials are maintained equal and opposite, common terminal 110 is maintained at ground potential. Under these conditions there is no input to amplifier 111 of the closed servo loop and azimuth motor 36 does not turn infrared collector 24. If now a signal from programmed azimuth search computer 102 actuates motor 104 to change the setting of the wiper on azimuth set potentiometer 106, the comparator circuit and the servo loop are unbalanced. Terminal 110 now acquires a potential the polarity of which is dependent on the direction of movement of the wiper on potentiometer 106. Servo amplifier 111 detects and amplifies this potential on terminal 110 and actuates azimuth motor 36 to rotate the collector in a direction and of a magnitude to cause the wiper on potentiometer 85 to pick off a new potential which is exactly equal and opposite to the new setting of azimuth set potentiometer 106.

A similar comparator circuit is utilized to compare the potentials picked off by the wipers of infrared azimuth pickoff potentiometer 85 and radar azimuth pickoff potentiometer 92. A closed loop servo system is also provided to insure that these potentials are equal and opposite in sign at all times. The comparator circuit consists of resistors 112, 113, and 114, while the closed loop servo system includes amplifier 115 and radar azimuth motor 37. Servo amplifier 115 detects and amplifies the deviation of common terminal 116 from a ground potential and actuates motor 37 to rotate radar antenna 17 in a direction and of a magnitude to cause equal and opposite potentials to be picked off by the wipers of potentiometers 85 and 92.

The circuits utilized to change in elevation the area being searched by infrared antenna 24 and radar antenna 17 and to synchronize in elevation the settings of the antennas are similar to those described above with respect to azimuth. Programmed elevation search computer 101 determines the setting of elevation set potentiometer 105 utilizing elevation set motor 103. The setting of potentiometer 105 is compared to the setting of infrared elevation across potentiometer 88 by comparator circuit 117. Closed loop servo system 118 insures continued coincidence of these settings. Comparator circuit 119 compares the settings of infrared elevation pickoff potentiometer 88 and radar elevation pickoff potentiometer 95. Closed servo system 120 maintains coincidence of these settings.

As previously pointed out, the sensitive axis of the telescope of infrared collector 24 does not always coincide with the search axis of the collector system but rather scans in a periodic manner a solid search angle about the search axis. The search axis is positioned in azimuth and elevation by the comparator circuits and closed loop servo systems described above. The preferred embodiment of the infrared reflecting telescope is described above with respect to FIG. 6. In this embodiment, secondary mirror 52 is tilted by solenoid 58 to thereby deflect the sensitive axis away from coincidence with search axis. Simultaneously mirror 52 is rotated about axis 60 utilizing motor 61. Selsyn generator 62 is attached to rotor 63 of motor 61 and continuously generates signals as a function of the rotational position of mirror 52.

Referring now to FIG. 4 the circuits utilized to accomplish the periodic scan of the solid search angle are shown. In this embodiment a substantially spiral conical scan is accomplished. Motor 61 is connected to power source 100 of constant D.-C. potential and preferably rotates at a constant speed. Solenoid coil 56 is subjected to the output of sawtooth generator 121. Motor 61 preferably rotates secondary mirror 52 many times during each cycle of output from generator 121. Thus mirror 52 may turn about axis 60 a hundred revolutions while it is being tilted by solenoid 58. A selsyn motor-generator set is utilized to synchronize a shaft rotation with the rotation of mirror 52. This selsyn set consists of generator 62 and motor 122 together with appropriate interconnecting links.

As previously pointed out, the potentials on the wipers of potentiometers 85 and 88 are an indication of the azimuth and elevation position angles of the search axis of infrared collector 24. Since the sensitive axis of the telescope may be deflected a slight amount away from this search axis by the scanning circuitry, compensation for this deflection must be made to the outputs from potentiometers 85 and 88 in order to obtain an accurate indication of the bearing of a target. This compensation is accomplished by utilizing resolver 140. Field winding 143 of resolver 140 is subjected to the sawtooth output from generator 121. Therefore the output voltage from rotor windings 141 and 142 are a function of the angular deflection of the sensitive axis from the search axis. The rotor windings further accomplish the breakdown of this angular deviation into elevation and azimuth components since the positioning of coils 141 and 142 effectively multiply the input by the sine and cosine respectively of the angle of rotation of the rotor. Thus the output from winding 141 is a voltage proportional to the instantaneous angular deviation in elevation of the sensitive axis of the telescope with respect to the search axis of collector 24. Similarly the output from winding 142 is a voltage proportional to the instantaneous angular deviation in azimuth of the sensitive axis with respect to the search axis. The outputs from windings 141 and 142 are combined with the outputs from potentiometers 88 and 85 respectively by summing networks 144 and 145. The outputs of networks 144 and 145 are coupled to the vertical and horizontal deflection plates respectively of oscilloscope 26 in indicator 4. An accurate type C presentation of azimuth and elevation is therefore available on oscilloscope 26. Voltmeters 146 and 147, appropriately calibrated to read degrees, further visually present indications of elevation and azimuth, respectively.

When switch 99 is placed in the track position, the apparatus continuously tracks a radiating target which appears within the scan pattern. The sensitive axis of the telescope is continuously maintained in coincidence with the search axis by a circuit described below.

Contacts on switch 99 isolate set motors 103 and 104 from their respective programmed search computers 101 and 102. Selsyn motor 122 rotates wipers 123 and 124, gauged 90° apart and electrically insulated from each other, around linearly wound ring potentiometer 125. Ring potentiometer 125 has equispaced terminals 126, 127, 128, and 129. Terminals 126 and 128 are grounded. Terminal 127 is connected to a positive potential source (not shown). Terminal 129 is connected to a negative potential source (not shown). The position of wiper 123 is adjusted with respect to the position of mirror 52 to be at ground potential when the sensitive axis of the telescope coincides in azimuth with the search axis. The position of wiper 124 is adjusted with respect to the position of mirror 52 to be at ground potential when the sensitive axis of the telescope is aligned in elevation with the search axis. Thus when mirror 52 is in the position shown in FIG. 6 and tilted a slight amount, the sensitive axis is deflected below the search axis but aligned in azimuth. Therefore wiper 123 is at ground potential and touches terminal 126 while wiper 124 picks off at negative potential and touches terminal 129. The latter indicates a negative or downward deflection in elevation of the sensitive axis with respect to the search axis of antenna 24.

The potentials picked off by wipers 123 and 124 are coupled through contacts of switch 99 to electronic switches 130 and 131 respectively. During one complete revolution of mirror 52 the potential inputs to switches 130 and 131 from wipers 123 and 124 have substantially the triangular wave form shown. It is to be noted that the potential input to switch 130 lags the potential input to switch 131 by 90°. An appropriate portion of three potentials are applied to set motors 104 and 103 respectively whenever a target is detected by infrared receiver 23. Thus referring to switch 130, the grids of thyratrons 132 and 133 are normally biased beyond cutoff by biasing batteries 134 and 135, respectively. A positive pluse from infrared receiver 23 coupled through a contact of switch 99 and to primary winding 136 of pulsing transformer 137 overcomes this biasing potential and allows one of the thyratrons to conduct. If the input to switch 130 is at a positive potential, indicating the target is on one side of the search axis, thyratron 132 conducts and continues to conduct until the input goes negative. This current flowing through thyratron 132 also flows through azimuth set motor 104. The result is a slight movement of the entire infrared collector toward the target. The search axis is thus brought more nearly into coincidence with the line of sight to the target. Each time receiver 23 detects the target, switch 130 allows a pulse to actuate motor 104 to move the search axis toward coincidence with the line of sight to the target. Eventually they coincide and switch 130 remains closed and motor 104 ceases to move since at the time of the firing pulse from receiver 23, the plate potentials on both thyratrons 132 and 133 are substantially zero. Simultaneously, switch 131 operates in a similar manner to bring the search axis into coincidence in elevation with the line of sight to the target.

Since the search axis of infrared collector 24 now coincides with the line of sight to the target, the output potentials from azimuth pickoff 85 and elevation pickoff 88 are accurate indications of the azimuth and elevation respectively of the target. By applying these potentials through summing networks 145 and 144 to the horizontal and vertical deflection plates of bearing oscilloscope 26 as shown in FIG. 2, a "type C" bearing presentation is obtained. It is to be noted by referring to FIG. 2, that the intensity coil of oscilloscope 26 is actuated by the amplified output from infrared receiver 23. Therefore only radiating targets are indicated on bearing oscilloscope 26. Conversely since range oscilloscope 27 is sensitive to the radar portion of the detector system, only solid or reflecting objects will be indicated on range oscilloscope 27. An indication of a target on one indicating oscilloscope without a corresponding indication on the other informs the observer that a false or artificial target has been detected. Only when a presentation is made on both indicators is it known that a true target exists.

Alternatively the output of the radar receiver may be coupled to the intensity coil of oscilloscope 26 in place of the output of the infrared receiver. The bias on this coil is adjusted so noise pulses are not seen. Then only a target that is both radiant and that gives a strong reflected radar signal will be seen on the bearings scope. Neither infrared decoys nor radar decoys will shown on this scope.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An interlocked radar and infrared detector system useful for obtaining the range and bearing of a target without the continuous or pulsed transmission of radiant energy comprising a normally blocked radar transmitter; a radar antenna adapted to be rotated about two orthogonal axes; means for rotating said radar antenna about each of said orthogonal axes; a radar receiver; means coupling said radar transmitter to said radar antenna during transmission time and said radar receiver to said radar antenna during reception time; means for unblocking said radar transmitter in response to an electric signal; an infrared optical collector adapted to be rotated about two orthogonal axes, each of said orthogonal axes being parallel to a corresponding axis of rotation of said radar antenna; means for rotating said infrared collector about each of said orthogonal axes; means for rotating in synchronism said radar antenna and said infrared collector about each parallel pair of rotation axes; programmed scanning means connected to said infrared collector and adapted to oscillate said collector in a manner to periodically aim said collector at all portions of a solid search angle; means for measuring the angular position of the sensitive axis of said infrared collector; an infrared receiver; means coupling said infrared collector to said infrared receiver, said infrared receiver producing an electric signal output whenever said infrared collector is subjected to radiant energy from a source thereof positioned along said collector's sensitive axis; means coupling said electric signal output of said infrared receiver to said radar transmitter unblocking means; range indicator means responsive to said radar transmitter and said radar receiver to produce an indication of the range to said radiating target; and bearing indicator means responsive to said infrared receiver and said infrared collector angle measuring means to produce an indication of the bearing of said radiating target whereby an accurate indication of the range and bearing of a radiating target is obtained without the continuous transmission of high frequency energy by said detector system.

2. An interlocked radar and infrared detector system useful for obtaining the range and bearing of a target without the continuous or pulsed transmission of radiant energy comprising a normally blocked radar transmitter, a radar antenna adapted to be rotated about two orthogonal axes; means for rotating said radar antenna about each of said orthogonal axes; a radar receiver; means coupling said radar transmitter to said radar antenna during transmission time and said radar receiver to said radar antenna during reception time; means for unblocking said radar transmitter in response to an electric signal; an infarared optical collector adapted to be rotated about two orthogonal axes, each of said orthogonal axes being parallel to a corresponding axis of rotation of said radar antenna; means for rotating said infrared collector about each of said orthogonal axes; means for rotating in synchronism said radar antenna and said infrared collector about each parallel pair of rotation axes; programmed scanning means connected to said infrared collector and adapted to oscillate said collector in a manner to periodically aim said collector at all portions of a solid search angle; means for measuring the angular position of the sensitive axis of said infrared collector; an infrared receiver; means coupling said infrared collector to said infrared receiver, said infrared receiver producing an electric signal output whenever said infrared collector is subjected to radiant energy from a source thereof positioned along said collector's sensitive axis; and means coupling said electric signal output of said infrared receiver to said radar transmitter unblocking means.

3. An interlocked radar and infrared detector system useful for obtaining the range and bearing of a target without the continuous or pulsed transmission of radiant energy comprising a normally blocked radar transmitter; a radar antenna; means for aiming said radar antenna; a radar receiver; means coupling said radar transmitter to said radar antenna during transmission time and said radar receiver to said radar antenna during reception time; means for unblocking said radar transmitter in response to an electric signal; an infrared optical collector; means for aiming said infrared collector; means for aiming in synchronism said radar antenna and said infrared collector; scanning means connected to said infrared collector and adapted to oscillate said collector in a manner to periodically aim said collector at all portions of a solid search angle; means for measuring the angular position of the sensitive axis of said infrared collector; an infrared receiver; means coupling said infrared collector to said infrared receiver, said infrared receiver producing an electric signal output whenever said infrared collector is subjected to radiant energy from a source thereof positioned along said collector's sensitive axis; and means coupling said electric signal output of said infrared receiver to said radar transmitter unblocking means.

4. An interlocked radar and infrared detector system useful for obtaining the range and bearing of a target without the continuous or pulsed transmission of radiant energy comprising a normally blocked radar transmitter; a radar antenna adapted to be rotated about two orthogonal axes; means for rotating said radar antenna about each of said orthogonal axes; a radar receiver; means coupling said radar transmitter to said radar antenna during transmission time and said radar receiver to said radar antenna during reception time; means for unblocking said radar transmitter in response to an electric signal; an infrared optical collector adapted to be rotated about two orthogonal axes, each of said orthogonal axes being parallel to a corresponding axis of rotation of said radar antenna; means for rotating said infrared collector about each of said orthogonal axes; means for rotating in synchronism said radar antenna and said infrared collector about each parallel pair of rotation axes; scanning means connected to said infrared collector and adapted to aim said collector at all portions of a solid search angle; means for measuring the angular position of the sensitive axis of said infrared collector; an infrared receiver; means coupling said infrared collector to said infrared receiver, said infrared receiver producing an electric signal output whenever said infrared collector is subjected to radiant energy from a source thereof positioned along said collector's sensitive axis; means coupling said electric signal output of said infrared receiver to said radar transmitter unblocking means; range indicator means responsive to said radar transmitter and said radar receiver to produce an indication of the range to said radiating target; and bearing indicator means responsive to said infrared receiver and said infrared collector angle measuring means to produce an indication of the bearing of said radiating target whereby an accurate indication of the range and bearing of a radiating target is obtained without the continuous transmission of high frequency energy by said detector system.

5. An interlocked radar and infrared detector system useful for obtaining the range and bearing of a target without the continuous or pulsed transmission of radiant energy comprising a normally blocked radar transmitter; a radar antenna; means for aiming said radar antenna; a radar receiver; means coupling said radar transmitter to said radar antenna during transmission time and said radar receiver to said radar antenna during reception time; means for unblocking said radar transmitter in response to an electric signal; an infrared collector; means for aiming said infrared collector; means for aiming in synchronism said radar antenna and said infrared collector; scanning means connected to said infrared collector and adapted to oscillate said collector in a manner to periodically aim said collector at all portions of a solid search angle; means for measuring the angular position of the sensitive axis of said infrared collector; an infrared receiver; means coupling said infrared collector to said infrared receiver, said infrared receiver producing an electric signal output whenever said infrared collector is subjected to radiant energy from a source thereof positioned along said collector's sensitive axis; means coupling said electric signal output of said infrared receiver to said radar transmitter unblocking means; range indicator means responsive to said radar transmitter and said radar receiver to produce an indication of the range to said radiating target; and bearing indicator means responsive to said infrared receiver and said infrared collector angle measuring means to produce an indication of the bearing of said radiating target whereby an accurate indication of the range and bearing of a radiating target is obtained without the continuous transmission of high frequency energy by said detector system.

References Cited in the file of this patent
UNITED STATES PATENTS

| | | |
|---|---|---|
| 2,369,622 | Toulon | Feb. 13, 1945 |
| 2,842,760 | McLucas | July 8, 1958 |
| 3,010,102 | Ketchledge | Nov. 21, 1961 |